United States Patent [19]

Erzsébet et al.

[11] Patent Number: 4,674,900
[45] Date of Patent: Jun. 23, 1987

[54] OPTOELECTROMECHANICAL APPARATUS FOR MEASURING PHYSICAL PARAMETERS, ESPECIALLY PRESSURE OR FORCE

[75] Inventors: Almásiné B. Erzsébet, Pesti; István Almási, Bartók; Árpád Tóth, Rókushegyi; István Benke, Csalit; Árpád Bajkay, Józsa, all of Hungary

[73] Assignees: Barsi Erzsebet Almasine; Banyaszati Aknamelyito Vallalat, both of Budapest, Hungary

[21] Appl. No.: 772,869

[22] Filed: Sep. 5, 1985

[30] Foreign Application Priority Data

Sep. 6, 1984 [HU] Hungary ............... 3370/84

[51] Int. Cl.$^4$ .................... G01J 5/54; G01K 5/62
[52] U.S. Cl. ...................... 374/131; 73/337; 73/517 R; 250/227; 250/231 R; 250/231 P; 374/205
[58] Field of Search ............ 73/705, 337, 517 R, 73/653; 250/231 P, 231 R, 227; 374/131, 205

[56] References Cited

U.S. PATENT DOCUMENTS

| 3,686,958 | 8/1972 | Porter et al. | 73/705 |
| 4,078,432 | 3/1978 | Stewart | 73/705 |
| 4,493,212 | 1/1985 | Nelson | 73/705 |
| 4,577,100 | 3/1986 | Meltz et al. | 250/231 P |

FOREIGN PATENT DOCUMENTS 0035035 3/1981 Japan ................... 73/705

Primary Examiner—Donald O. Woodiel
Attorney, Agent, or Firm—Michael N. Meller

[57] ABSTRACT

The invention relates to an optoelectromechanical apparatus for measuring physical parameters, as pressure or force, comprising an emitting optical fibre coupled via its input with a light source, receiving optical fibre connected over its output to signal processing means and a carrier including a resilient member for bearing the emitting and the receiving optical fibres, wherein the input of the receiving optical fibre is in optical coupling with the output of the emitting optical fibre, advantageously through a spacing and the processing means comprise a first and a second photodiodes for detecting light of the light source and the light output of the receiving optical fibre.

19 Claims, 13 Drawing Figures

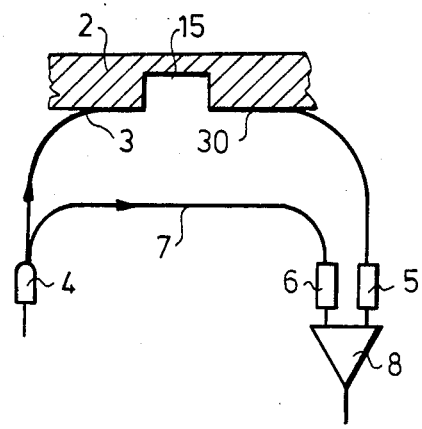
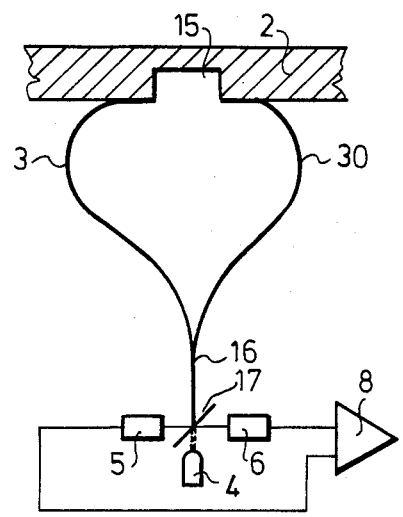
Fig.1
Fig.2
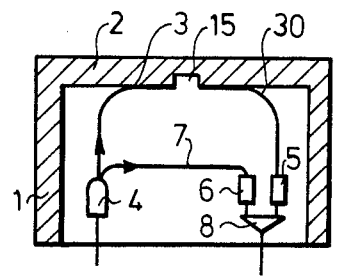
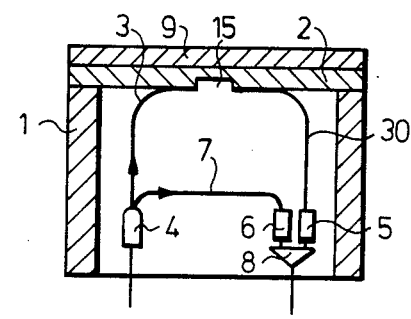
Fig.3
Fig.5
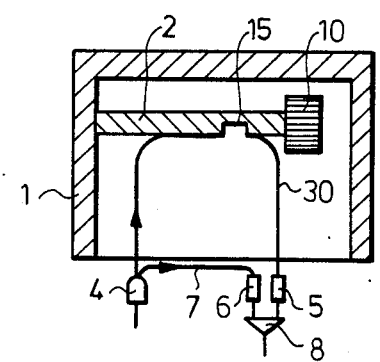
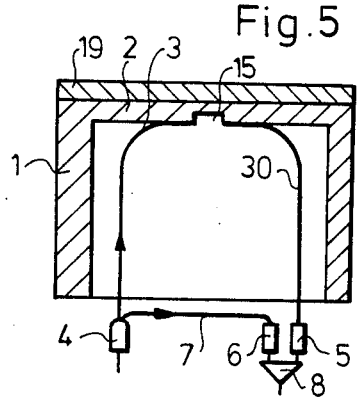
Fig.4
Fig.6

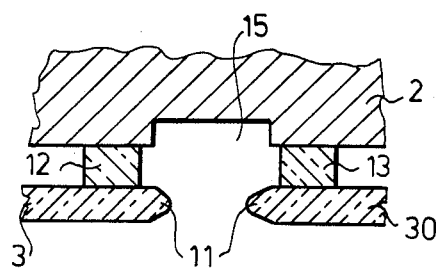
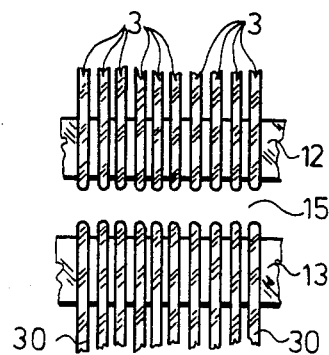
Fig. 7    Fig. 8
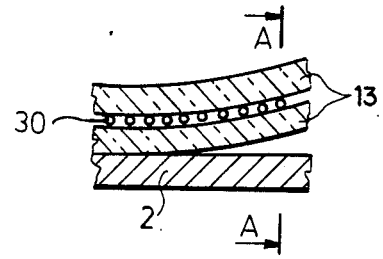
Fig. 9
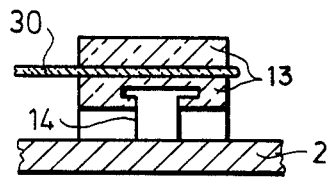
Fig. 11
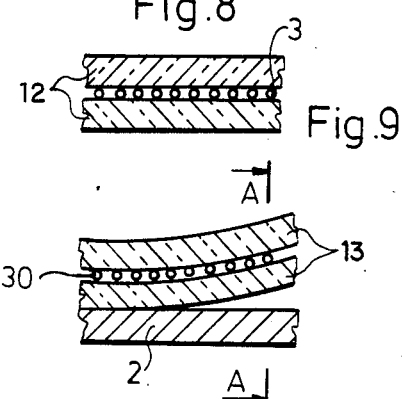
Fig. 10

OPTOELECTROMECHANICAL APPARATUS FOR MEASURING PHYSICAL PARAMETERS, ESPECIALLY PRESSURE OR FORCE

BACKGROUND OF THE INVENTION

The invention concerns an optoelectromechanical apparatus for carrying out measurements of different physical parameters, especially pressure or force after transforming them into translation. The apparatus as proposed by the invention includes an optical emitting device and an optical receiving device with an optical fibre.

A know principle of metrology is that a physical parameter can be measured after transforming it into a translation. The translation can be applied for deforming a sensing element, and the deformation caused by the translation is characteristic for the physical parameter to be measured. The measurements can be carried out in a continuous manner, too. The prior art considers the use of some kinds of semiconducting elements to be very advantageous for measuring small deformation. The disadvantages linked with the application of semiconducting elements are their sensibility to changes of temperature, the limited, relatively narrow temperature range of application and their sensibility to some kinds of environmental factors, especially in the industry. Many different measures are known for avoiding these disadvantages or to limit their harmful influence.

In the prior art some optoelectromechanical arrangements can be found comprising optical fibres for measuring translation. An apparatus for carrying out such measurements includes two optical fibres: one of them acts as emitting device coupled with a light source and the other as receiving device connected to different elements for data processing. The receiving device faces the output of the emitting device and is capable of sensing the changes of the light intensity at the receiving device. Because the devices are arranged on different parts of the apparatus, they should be incorporated with high accuracy. A prismatic optical element is generally applied for optically coupling the output of the emitting device with the input of the receiving device and this element should be arranged also with high accuracy. Two lenses are connected to the prismatic element, both generally stuck to its surfaces facing the optical fibers of the respective devices. The lenses should focus the light in order to transmit it from the emitting device to the receiving device. The disadvantage of this solution is that the arrangement should meet high accuracy requirements and that the prismatic and other optical elements can hardly be protected against being dirtied. Such dirtying causes diminished light output and thus constitutes an uncontrollable factor of the measurements.

The object of the invention is an apparatus which is free of the abovementioned disadvantages and which is capable of carrying out different measurements in practically any kind of industrial environments, except very high temperatures, and ensuring high accuracy and reliability of the measured values. The proposed optoelectromechanical apparatus should allow production by simple technology.

SUMMARY OF THE INVENTION

The invention is based on the recognition that the fibres of the emitting and the receiving optical devices should be arranged on the same single mechanical construction which is deforming under influence of the physical parameter to be measured, wherein between the output of the emitting optical device and the input of the receiving optical device a spacing should be realized. The deforming mechanical construction can be arranged in a closed housing, thereby protecting it against the environmental factors causing dirtying or other disturbance of the measurements.

The proposed apparatus includes an emitting optical fibre coupled via its input with a light source and a receiving optical fibre connected via its output with a unit for evaluating the measured values, e.g. to signal processing means. The essence of the invention is that for carrying out high-accuracy measurements the apparatus comprises further a carrier including a resilient member for bearing the emitting and the receiving optical fibres, wherein the input of the receiving optical fibre is optically coupled with the output of the emitting optical fibre, advantageously through a spacing, and the processing means comprise first and second photosensitive elements, e.g. photodiodes for detecting the intensities of the light source and the light output of the receiving optical fibre, respectively.

In an advantageous embodiment of the optoelectromechanical apparatus according to the invention the input of the receiving optical fibre and the output of the emitting optical fibre are arranged oppositely and separated by a spacing.

The optical coupling in the proposed optoelectromechanical apparatus can be realized in another advantageous way, too: the receiving optical fibre and the emitting optical fibre are arranged on the same side of a spacing opppositely to a reflecing element arranged on the other side and the reflecting element is connected to the carrier, wherein the reflecting element is preferably connected to the carrier by means of a resiliently movable element, e.g. by a spring-biased guiding unit, and it is guided along a line before the receiving and emitting optical fibres.

It is an advantageous embodiment of the invented optoelectromechanical apparatus that for effective processing of the measured values, the light source is connected to the first photosensitive element by way of a reference optical fibre and the outputs of the first and second photosensitive elements are connected to respective inputs of a comparator.

The optoelectromechanical apparatus can effectively work in noisy conditions also, if the receiving optical fibre and the emitting optical fibre comprise similarly shaped ends forming cylindrical lens.

For temperature measurements it is preferable to make the carrier of the invented optoelectromechanical apparatus in the form of a bimetal element.

In a further advantageous embodiment of the optoelectromechanical apparatus according to the invention the receiving optical fibre and the emitting optical fibre are connected together at least at the input area of the emitting optical fibre and the output area of the receiving optical fibre, the optical fibres forming in this areas a common optical fibre. The optical system of the proposed optoelectromechanical apparatus can be simplified in a significant manner when the receiving optical fibre and the emitting optical fibre are connected together over their entire length to form the common optical fibre.

This simplified optical system comprises a semi-transparent reflecting element, e.g. a mirror with appropriate optical layers arranged before the input area of the emitting optical fibre wherein a layer reflects the light of the light source to the first photosensitive element, and the second photosensitive element is optically coupled with the output of the common optical fibre.

In a further advantageous embodiment of the invented optoelectromechanical apparatus the possibilities of application are widened to different regulating means of appropriate regulation characteristic because at least two emitting optical fibres and at least two receiving fibres are arranged in parallel lines on bearing elements at two sides of the spacing, wherein the bearing elements are connected with the carrier, and preferably one of the bearing elements is made of flexible material.

It is possible to take into account a characteristic if in the proposed optoelectromechanical apparatus at least one of the receiving optical fibres and at least one of the optical fibres are arranged along different parallel lines on the bearing elements and the flexible bearing element includes e.g. a dove-tail guiding part.

BRIEF DESCRIPTION OF THE DRAWINGS

The objects, features and advantages of the present invention are readily apparent from the following description of some preferred embodiments given in an illustrative and non-limiting way, wherein reference is made to the accompanying drawings in which:

FIG. 1 shows partly in cross-section one of the possible basic embodiments of the optoelectromechanical apparatus according to the invention comprising three optical fibres;

FIG. 2 shows partly in cross-section another possible basic embodiment of the proposed optoelectromechanical apparatus comprising two optical fibres;

FIG. 3 shows partly in cross section an embodiment of the optoelectromechanical apparatus according to the invention for measuring pressure or pressure difference;

FIG. 4 shows partly in cross section the embodiment of the invented optoelectromechanical apparatus proposed for use in measurement of acceleration;

FIG. 5 shows partly in cross section a further preferred embodiment of the proposed optoelectromechanical apparatus for measuring temperature;

FIG. 6 shows partly in cross section another preferred embodiment of the proposed optoelectromechanical apparatus for measuring humidity of the air;

FIG. 7 shows partly in cross-section a part of an embodiment of the proposed optoelectromechanical apparatus with optical fibers forming an optical lens;

FIG. 8 is a bottom partial view of another the basic embodiment of FIG. 7 comprising more then one optical fibre arrayed at each side of a spacing realised by bearing elements;

FIG. 9 is the cross-section of an unflexible bearing element with emitting optical fibres for use in another embodiment;

FIG. 10 is a cross-section of a flexible bearing element with receiving optical fibres for use in the embodiment according to FIG. 9;

FIG. 11 is another cross-section, taken along section A—A of FIG. 10, of the flexible bearing element with the guiding element modifying the position of the receiving optical fibres for use in the embodiment according to FIG. 9;

DESCRIPTION OF THE PREFERRED EMBODIMENTS

Figure 12:
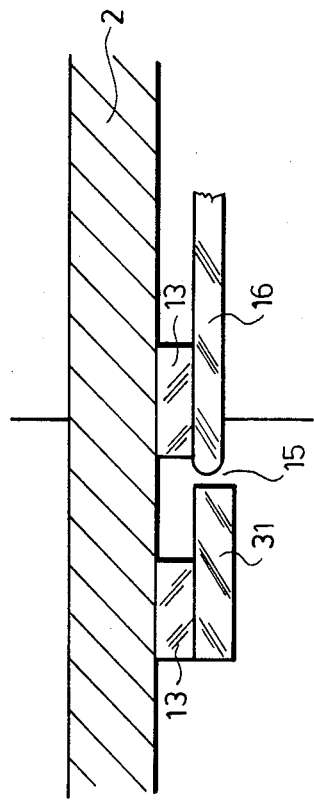
FIG. 12 is the side view with partial cross-section of the invented optoelectromechanical apparatus comprising only one optical fibre.

The optoelectromechanical apparatus for measuring physical parameters is not presented in FIGS. 1 to 6 on a representative scale with respect to the physical dimensions. In a closed or open housing 1 or on a wall thereof a carrier element 2 made of resilient material or supported in a resilient way is provided, wherein advantageously carrier element 2 has a spacing 15. The spacing 15 is generally a channel made in the housing 1, usually along a straight line. An emitting optical fibre 3 is connected to a light source 4 and with its free end its reaches one side of the spacing 15. Oppositely to the emitting optical fibre 3, on the other side of the spacing 15 a receiving optical fibre 30 is arranged. It is possible also to use a common optical fibre 16 joining the emitting and receiving optical fibres 3, 30 along part or the entire length thereof. In the optoelectromechanical apparatus according to the invention the number of emitting optical fibres 3 and receiving optical fibres 30, or generally the number of optical fibres, for carrying out measurements is not limited. If their number is higher than two, the fibres 3 and 30 need not be located always in pairs, i.e. in lines receiving an emitting optical fibre 3 and a receiving optical fibre 30 respectively, their number can be different, too. The light emitted by the light source 4 is emitted by the free end of the emitting optical fibre 3 to a first photosensitive element, e.g. a first photodiode 6, and the the light of the receiving optical fibre 30 is transmitted to a second photosensitive element, e.g. a second photodiode 5. The first photosensitive element is connected to the light source 4 by means of a semitransparent mirror 17 (FIG. 2) or a reference optical fibre 7 (FIG. 1, FIGS. 3 to 6). The photosensitive elements, i.e. photodiodes 5 and 6, are connected to means for data processing, e.g. a comparator 8 generating an output signal which is proportional to the difference between the output signals of the two photosensitive elements, or depends on this difference according to a well-defined function.

In the measuring apparatus of the invention the light source 4 and the photosensitive elements, like photodiodes 5 and 6, can be arranged either in the housing 1 (FIGS. 3 and 5) or outside thereof (FIGS. 4 and 6). The arrangement depends always on the conditions of application. The resilient carrier element 2 can form together with a metallic layer 9 (FIG. 5) a bimetallic element for measuring temperature or together with a deformable layer 19 (FIG. 6) a measuring element for measuring humidity. If the resilient carrier element 2 forms a membrane (FIG. 3), the apparatus according to the invention is capable of measuring pressure or difference of pressures. It is possible also to apply a measuring mass 10 (FIG. 4) on the basis of which the apparatus is capable of measuring force or acceleration values.

For increasing the quantity of light transmitted to the receiving optical fibre 30, it is possible to use a lens 11. This lens 11 can form a special element or consist of the respective end portions of the optical fibres 3 and 30 (FIG. 7). In this way the low light output of the emitting optical fibre 3 is concentrated, thereby increasing the output of the receiving optical fibre to 30. This solution can ensure high sensitivity in case of light sources of low power and/or in a polluted environment.

A further possibility lies in arranging bearing elements 12 and 13 on the two sides of the spacing 15 for carrying the one or more emitting optical fibres 3 and one or more receiving optical fibres 30 (FIG. 8). Of course, the length of the bearing elements 12 and 13 depends on the number of optical fibres applied in the apparatus. The optical fibres 3 or 30 on the respective sides of the spacing 15 are arranged generally in parallel lines. One of the bearing elements, e.g. that denoted by 12 (FIG. 9) is straight and the other, in this case denoted by 13, is flexible and curved (FIG. 10). The apparatus with flexible bearing element 13 comprises receiving optical fibres 30 which are not in each case collinear with the emitting optical fibres 3. The form changes of the flexible bearing element 13 cause changes in the amounts of light input to the receiving optical fibres 30, the changes being not proportional to the light output of the emitting optical fibres 3. In this case it is possible to regulate the system of the optical fibres according to the range of the highest sensibility of the detecting means, e.g. the comparator, in order to generate signals corresponding to selected value ranges. This can be especially advantageous when the apparatus according to the invention should be used in systems of regulating different processes. The shape of the flexible bearing element 13 can be changed also by a guiding part 14 inside it, which can be e.g. dove-tail shaped. The guiding part 14 is fitted to a guiding element or a flexible element and on the basis of this the shape of the flexible bearing element 13 can be regulated.

Figure 13:
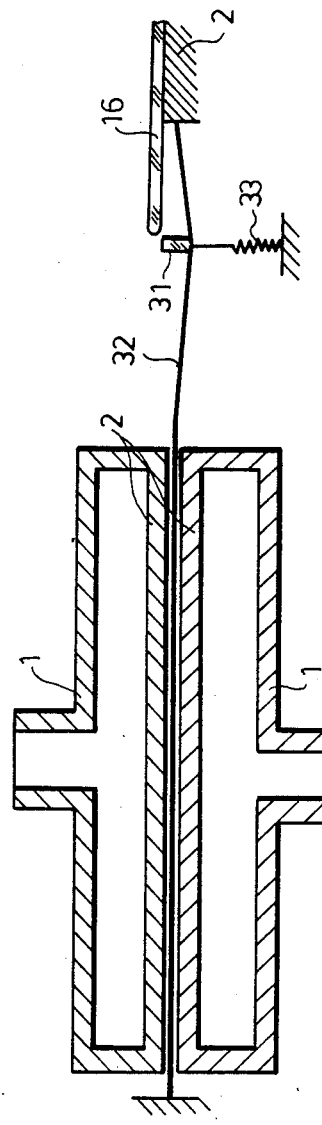
FIG. 13 is the cross-section of the invented optoelectromechanical apparatus for carrying out measurements of pressure differences.

The apparatus according to the invention can be constructed with a common optical fibre 16 acting as an emitting optical fibre (FIG. 2, FIGS. 12 and 13). The input of each common optical fibre 16 can be connected, as mentioned above, with the semitransparent mirror 17, passing the light output of the light source 4 to the common optical fibre 16 and reflecting the light output of the light source 4 and the common optical fibre 16 to the photosensitive elements. The common optical fibre 16 divides after its straight part (FIG. 2) into two separate parts respectively forming the emitting optical fibre 3 and the receiving optical fibre 30. Another possibility is to use only one optical fibre uniting and forming the receiving and the emitting optical fibres 3, 30 along its entire length. One end of the common optical fibre 16 which replaces a pair of receiving and emitting optical fibres is optically coupled to the light source 4 and its other end is optically coupled to a reflecting element 31 arranged oppositely to this end and defining the spacing 15. The reflecting element 15, e.g. a mirror, is arranged in a manner which enables its movement in front of the end of the optical fibre under influence of the external conditions determining the parameter to be measured (FIG. 12). The reflecting element 31 can cooperate with a thin fibre 32 arranged between flexible carrier elements 2 for detecting changes in pressure, fiber 32 being tensioned by a spring 33. Under influence of the pressure the thin fibre can be displaced and this displacement makes the reflecting element 31 move in front of the common optical fibre 16 (FIG. 13). In this case practically no spacing 15 is necessary.

The apparatus according to the invention operates in the following manner:

The light output of the light source 4 is conducted to the first and the second photodiodes 5, 6. The first photodiode 6 receives the light of the light source 4, and the second photodiode 5 receives the light carrying information about the parameter to be measured. The optical coupling between the emitting optical fibre 3 and the receiving optical fibre 30 or the optical coupling of the common optical fibre 16 with itself by means of the reflecting element 31 ensures the acquisition of information about the parameter to be measured, this information being characteristic for the physical process causing deformation of the housing 1. The photodiodes 5 and 6 generate signals corresponding to the corresponding light inputs and the comparator 8 or other data processing means ensures an output signal which is characteristic for this difference. In case of lack of any external influence resulting in deformation of the housing 1, the photodiodes 5 and 6 should generally receive the same light inputs. The deformation of the housing and/or the carrier 2 together with the bearing elements 12 and 13 makes the light input of the second photodiode 5 change, on the basis of which the comparator 8 gives a corresponding output signal which depends in a well-defined way on the force causing the change. By means of different materials used in the carrier 2 and together therewith it is possible to realise a measuring apparatus for determining different parameters (e.g. pressure, temperature, force, acceleration, and humidity) wherein it is possible to measure absolute values and differences as well. The unit for determining the measured values can be constructed on the basis of many known electronic arrangements.

As mentioned previously, it is possible to arrange a greater number of receiving optical fibres 30 and oppositely to them, although not necessarily collinear therewith, a greater number of emitting optical fibres 3. The number of emitting optical fibres 3 can be e.g. greater then ten, and oppositely the number of receiving optical fibres can be the same or different. By means of the flexible bearing element 13 and/or by selecting different distances between the optical fibres, it is possible to make the light input of the second photodiode change with the light intensity in a nonlinear manner, e.g. along a curve being optimal for application in a regulating unit. By use of the guiding part 14 the measuring apparatus can be regulated according to the parameters of the regulating unit.

The optoelectromechanical apparatus according to the invention can be used in very different conditions of application. Its life duration is long and shows low sensitivity against different outer influences not coupled with the processes characterised by the parameter to be measured.

It can be readily understood from the foregoing that the optoelectromechanical apparatus according to the invention is not limited any way to the examples shown above. The scope of protection is determined by the attached claims and not by the examples on the basis of which without departing the scope of protection, it is possible to realise a lot of different advantageous embodiments for different purposes, embodiments being able for carrying out other measurements than these mentioned in the description.

What we claim is:
1. An optoelectromechanical apparatus for measuring a physical parameter, comprising a resilient carrier element, first and second optical fibers connected to said carrier element such that a first end of said first optical fiber and a first end of said second optical fiber are optically coupled, a third optical fiber, a light source optically coupled to a second end of said first optical fiber and a first end of the third optical fiber, and a signal processing means optically coupled to a second end of said second optical fiber and a second end to said third optical fiber, said signal processing means including first and second photosensitive elements, wherein the optical signal coupled from said first optical fiber to said second optical fiber during activation of said light source is dependent on the deformation of said resilient carrier element in response to variation of said physical parameter.

2. The optoelectromechanical apparatus as defined in claim 1, wherein a channel is formed in said carrier element, the first end of said first optical fiber being arranged on one side of said channel and the first end of said second optical fiber being arranged in opposition on the other side of said channel, the opposing ends of said first and second optical fibers being separated by a spacing.

3. The optoelectromechanical apparatus as defined in claim 1, wherein a channel is formed in said carrier element, further comprising a reflecting means arranged on one side of said channel, the first end of said first optical fiber and the first end of said second optical fiber being arranged in opposition on the other side of said channel, said reflecting means and the first ends of said first and second optical fibers being separated by a spacing.

4. The optoelectromechanical apparatus as defined in claim 3, wherein said reflecting means is coupled to said carrier element by means of a resiliently movable element, whereby the degree of optically coupling between said reflecting means and said first and second optical fibers is dependent on the deformation of said carrier element in response to variation of said physical parameter.

5. The optoelectromechanical apparatus as defined in claim 1, wherein said signal processing means further comprises comparator means connected to said first and second photosensitive elements, said comparator means outputting a signal dependent on the difference between the respective optical signals received by said first and second photosensitive elements.

6. The optoelectromechanical apparatus as defined in claim 1, wherein the first end of said first optical fiber and the first end of said second optical fiber are formed as cylindrical lenses.

7. The optoelectromechanical apparatus as defined in claim 1, wherein said carrier element comprises a bimetal element and said physical parameter is temperature.

8. The optoelectromechanical apparatus as defined in claim 1, wherein said photosensitive elements comprise photodiodes.

9. An optoelectromechanical apparatus for measuring a physical parameter, comprising a resilient carrier element, first and second optical fiber means having a first end in common and having respective second ends connected to said carrier element, said second ends being optically coupled to each other, a light source optically coupled to said common end, a signal processing means including first and second photodetective elements, and deflecting means for deflecting optical signals from said light source to said first photodetective element and for deflecting optical signals from said common end to said second photodetective element, wherein the optical signal coupled between said second ends of said first and second optical fiber means during activation of said light source is dependent on the deformation of said resilient carrier element in response to variation of said physical parameter.

10. The optoelectromechanical apparatus as defined in claim 9, wherein a channel is formed in said carrier element, said second ends of said first and second optical fibers being arranged on opposing sides of said channel with a spacing therebetween.

11. The optoelectromechanical apparatus as defined in claim 9, wherein said deflecting means comprises a semi-transparent mirror.

12. The optoelectromechanical apparatus as defined in claim 9, wherein said carrier element comprises a bimetal element.

13. The optoelectromechanical apparatus as defined in claim 9, wherein said photosensitive elements comprise photodiodes.

14. An optoelectromechanical apparatus for measuring a physical parameter, comprising a resilient carrier element, a first plurality of optical fibers connected to said carrier element in a substantially parallel array by means of a first bearing element whereby an end of each of said first plurality of optical fibers is located on one side of a spacing extending substantially transverse to said parallel fibers, a second plurality of optical fibers connected to said carrier element in a substantially parallel array by means of a second bearing element whereby an end of each of said second plurality of fibers is located on the other side of said spacing, the optical fibers of said first plurality being substantially parallel to the optical fibers of said second plurality, said ends of said first plurality of optical fibers being optically coupled to said ends of said second plurality of optical fibers, a reference optical fiber, a light source optically coupled to the other ends of said first plurality of optical fibers and to an end of said reference optical fiber, and a signal processing means optically coupled to the other ends of said second plurality of fibers and to the other end of said reference optical fiber, said signal processing means including first and second photosensitive elements, wherein the optical fibers of said first plurality are not all collinear with the optical fibers of said second plurality and the optical signal coupled to said second plurality of optical fibers during activation of said light source is a non-linear function of the optical signal from said first plurality of optical fibers.

15. The optoelectromechanical apparatus as defined in claim 14, wherein one of said first and second bearing elements is made of flexible material.

16. The optoelectromechanical apparatus as defined in claim 15, further comprising an adjustment element coupled to said one flexible bearing element for altering the shape of said one flexible bearing element.

17. The optoelectromechanical apparatus as defined in claim 14, wherein a channel is formed in said carrier element, said ends of said first and second pluralities of optical fibers being respectively arranged on opposite sides of said channel.

18. The optoelectromechanical apparatus as defined in claim 14, wherein said carrier element comprises a bimetal element.

19. The optoelectromechanical apparatus as defined in claim 14, wherein said photosensitive elements comprise photodiodes.

* * * * *